United States Patent
Wolf

(10) Patent No.: US 12,508,519 B2
(45) Date of Patent: Dec. 30, 2025

(54) DISTILLATION UNIT AND METHOD FOR SEPARATING A LIQUID SUBSTANCE MIXTURE INTO TWO TO SIX LIQUID PRODUCT FLOWS WITH DIFFERENT COMPOSITIONS

(71) Applicant: Covestro Deutschland AG, Leverkusen (DE)

(72) Inventor: Ulrich Wolf, Kerken (DE)

(73) Assignee: Covestro Deutschland AG, Leverkusen (DE)

( * ) Notice: Subject to any disclaimer, the term of this patent is extended or adjusted under 35 U.S.C. 154(b) by 245 days.

(21) Appl. No.: 18/253,606

(22) PCT Filed: Nov. 22, 2021

(86) PCT No.: PCT/EP2021/082497
§ 371 (c)(1),
(2) Date: May 19, 2023

(87) PCT Pub. No.: WO2022/106685
PCT Pub. Date: May 27, 2022

(65) Prior Publication Data
US 2024/0009591 A1    Jan. 11, 2024

(30) Foreign Application Priority Data

Nov. 23, 2020 (EP) .................... 20209257

(51) Int. Cl.
*B01D 3/14* (2006.01)
*B01D 1/06* (2006.01)
(Continued)

(52) U.S. Cl.
CPC ............ *B01D 3/148* (2013.01); *B01D 1/065* (2013.01); *B01D 3/322* (2013.01); *C07C 209/86* (2013.01); *C07C 263/20* (2013.01)

(58) Field of Classification Search
CPC ........ B01D 1/065; B01D 3/148; B01D 3/322; C07C 209/86; C07C 263/20
See application file for complete search history.

(56) References Cited

U.S. PATENT DOCUMENTS 3,309,288 A    3/1967 Butterbaugh
3,926,785 A * 12/1975 Siegel ................. C10G 45/02
                                                          208/354

(Continued)

FOREIGN PATENT DOCUMENTS

DE    1208291 B    1/1966
DE    3106350 A1  12/1981
(Continued)

OTHER PUBLICATIONS

International Search Report, PCT/EP2021/082497, date of mailing: Feb. 25, 2022, Authorized officer: J. Van Ganswijk .

*Primary Examiner* — Jonathan Miller
(74) *Attorney, Agent, or Firm* — Donald R. Palladino

(57) ABSTRACT

The invention relates to a distillation unit (100 000) which is designed for a continuous distillation process and to a method for a continuous operation for separating a liquid substance mixture (10) into two to six liquid product flows (201, 202, ...) with different compositions and into a gaseous product flow (300). For this purpose, an evaporation unit (10 000) is provided consisting of multiple evaporation devices (10 000-1, 10 000-2, ...), wherein each evaporation device has a circuit device (1 200-1, 1 200-2, ...) for recirculating a sub-quantity of each of the liquid sump flows (22, 21, ...) of an evaporation device into the respective evaporation device, and each of the circuit devices additionally has a discharge device (1 300-1, 1 300-2, ...) for providing one of the liquid product flows (201, 202, ...).

21 Claims, 5 Drawing Sheets

(51) Int. Cl.
    *B01D 3/32*     (2006.01)
    *C07C 209/86*     (2006.01)
    *C07C 263/20*     (2006.01)

(56) References Cited

U.S. PATENT DOCUMENTS

| | | | | |
|---|---|---|---|---|
| 4,422,903 A * | 12/1983 | Messick | | B01D 3/065 203/25 |
| 4,596,588 A * | 6/1986 | Cook | | F25J 3/0209 62/621 |
| 5,264,117 A * | 11/1993 | DeLong | | C10G 7/00 203/79 |
| 6,106,674 A * | 8/2000 | Agrawal | | F25J 3/0295 203/99 |
| 6,240,744 B1 * | 6/2001 | Agrawal | | F25J 3/04733 62/643 |
| 6,286,335 B1 * | 9/2001 | Agrawal | | F25J 3/04793 62/631 |
| 6,498,261 B1 | 12/2002 | Ewbank et al. | | |
| 6,550,274 B1 | 4/2003 | Agrawal | | |
| 7,867,365 B2 * | 1/2011 | Brown | | B03D 1/1431 203/25 |
| 8,246,791 B2 * | 8/2012 | McGinnis | | B01D 3/146 423/220 |
| 10,569,192 B2 * | 2/2020 | Asprion | | B01D 3/326 |
| 10,577,311 B2 | 3/2020 | Knauf et al. | | |
| 10,689,322 B2 | 6/2020 | Knauf et al. | | |
| 11,612,829 B1 * | 3/2023 | Kockler | | B01D 3/146 203/81 |
| 2007/0000769 A1 * | 1/2007 | Brown | | B01D 3/005 202/173 |
| 2008/0161618 A1 | 7/2008 | Zimmermann et al. | | |
| 2010/0025221 A1 * | 2/2010 | Agrawal | | B01D 3/143 203/82 |

FOREIGN PATENT DOCUMENTS

| | | |
|---|---|---|
| DE | 19531806 C1 | 4/1997 |
| DE | 19631332 A1 | 11/1997 |
| DE | 102019219557 A1 | 5/2020 |
| EP | 0141358 A1 | 5/1985 |
| EP | 0895982 A1 | 2/1999 |
| JP | 200302725 A | 10/2000 |

* cited by examiner

DISTILLATION UNIT AND METHOD FOR SEPARATING A LIQUID SUBSTANCE MIXTURE INTO TWO TO SIX LIQUID PRODUCT FLOWS WITH DIFFERENT COMPOSITIONS

CROSS-REFERENCE TO RELATED APPLICATION

This application is a national stage application under 35 U.S.C. § 371 of PCT/EP2021/082497, filed Nov. 22, 2021, which claims the benefit of European Application No. 20209257.3, filed Nov. 23, 2020, each of which is incorporated herein by reference.

FIELD

The present invention relates to a distillation unit (100 000) designed for continuous distillation and a continuously operated process for separating a liquid substance mixture (10) into 2 to 6 liquid product streams (201, 202, . . . ) of differing composition and into a gaseous product stream (300). To this end, an evaporation unit (10000) formed of two or more evaporation devices (10000-1, 10000-2, . . . ) is provided, wherein each evaporation device has a circulation device (1 200-1, 1 200-2, . . . ) for recycling a portion of each of the liquid bottom streams (22, 21, . . . ) of an evaporation device into the respective evaporation device, wherein in addition each of these circulation devices has a discharge device (1 300-1, 1 300-2, . . . ) for providing one of the liquid product streams (201, 202, . . . ).

BACKGROUND

Many industrial applications require the separation of liquid mixtures into their constituents. Among other methods, thermal separation by distillation is widely used. In industrial processes involving large amounts of substance mixtures for distillation, distillation plants are typically operated continuously, that is to say the substance mixture to be distilled is continuously supplied to the distillation column (at a defined flow rate) and the products of the distillation are continuously withdrawn from the distillation column (again at defined flow rates). Aside from maintenance-related production downtimes, continuous distillations of this type are operated for as long as the demand for the products requires it. This is to be distinguished from batch distillation (also referred to as discontinuous distillation) in which always only a defined absolute amount of a substance mixture to be separated is charged in the distillation column and distilled. Batch distillations of this type can be operated only until the substance mixture charged has been completely distilled. If yet further products of the distillation are then required, a new distillation process must be started. Batchwise operated distillations are common for laboratory applications. In industrial processes, they are usually only used for obtaining specialty chemicals or pharmaceutical products, where the amounts to be distilled are comparatively small. A batch distillation of a multicomponent system using at least three distillation zones is described for example in U.S. Pat. No. 6,550,274. The challenges in a batchwise operated distillation differ markedly from those of a continuously operated distillation (see U.S. Pat. No. 6,550, 274, column 4, lines 9 to 28).

The present invention is concerned only with continuous distillation processes. To conduct a continuously operated distillation, in the simplest case a distillation column is continuously fed with the substance mixture to be separated via a feed, with a liquid phase composed of comparatively high-boiling constituents being continuously discharged in the lower region of the distillation column (what is known as the bottom of the column), while a comparatively low-boiling distillate is taken off continuously in liquid or gaseous form in the upper region of the distillation column (what is known as the top of the column). Many different variations of this simple basic principle are known.

Thus, for example, a plurality of distillate streams of differing composition may be withdrawn, which is possible in particular if the distillation column is in the form of what is known as a dividing wall column, in which the interior of the column body is divided into two (or more) chambers by a vertical dividing wall (or a plurality of vertical dividing walls) over a portion of the column height. Two or more distillation columns may also be connected in series in order to improve the separating effect. A multiplicity of internals having a separating effect, such as for example packings, are also used to improve the separating action.

What is common to all of these variants is that in continuous operation with given process parameters, exactly one bottom product is obtained in each distillation column at a given point in time. If the production of different bottom products is desired, a conventional distillation plant can be operated with different process parameters (pressure, temperature). This results in a change in the composition of the bottom product (and in many cases also in that of the top product). For the production of two different bottom products, it is accordingly necessary to first operate a distillation column with the process parameters required for producing the first bottom product. To obtain the second bottom product, the process parameters have to be changed. Between these two operating states for obtaining the first and second bottom product, there is a transition phase in which in the worst case only product is obtained which does not satisfy the requirements. In addition to the disadvantage that it is not possible to obtain both bottom products simultaneously, there is also the disadvantage of product loss.

The simultaneous continuous separation of a substance mixture into two or more bottom products is desirable in particular when two or more bottom products can be obtained from the substance mixture, but only one distillate. This is the case when the boiling point of the distillate phase is substantially lower than that of the bottom phase. In this case, different bottom products can be obtained by evaporating the distillation bottoms to different extents. Then, the low-boiling distillate is obtained with essentially identical composition, but in different amounts, in (for example) two distillation operations, but with a different bottom product being obtained in each of the distillation operations. In order to be able to continuously produce the two bottom products simultaneously, according to the prior art either two distillation columns are required or one distillation column must be configured as a dividing wall column with a dividing wall reaching down to the base of the column.

DE 196 31 332 A1 is concerned with a process for removing disruptive high-boiling or even solid components from the solvent circuit of regenerable absorption processes, such as for example gas scrubbing operations, liquid/liquid extractions or extractive distillations. Preferred embodiments include configurations of a regeneration column for regenerating a laden solvent, in which the column has two continuously operated evaporators of which one serves to adjust the concentration of a relatively low-boiling component in the solvent and the other serves to adjust the concentration of the relatively high-boiling component in the solvent. The undesired high-boiling impurities are intermittently slurried out from the latter. The continuous production of two bottom products (in particular two bottom products of value) is not described.

US 2008/0161618 A1 is concerned with the separation of a mixture of n-butane, isobutane and various butene isomers. A distillation column is described which in its interior has a dividing wall running through the entire longitudinal section of the column body. Isobutene is obtained as distillate. A stream of a mixture of 2-butene and n-butane and a stream of 1-butene are obtained in the bottom of the column which is divided into two. The two reboilers serve to heat a substream of each of the liquid bottoms discharge streams from the column and return it back to the column as a liquid/vapor mixture. The reboilers are not designed to provide a liquid bottom stream and a gas stream. Dividing wall columns have the fundamental disadvantage of being significantly more challenging to control compared to simple columns connected in series.

WO 2017/005565 A1 is concerned with the problem of ensuring the uniform distribution of the liquid/vapor mixture formed in each stage to the following stage in distillations comprising multistage evaporation, without having to accept other disadvantages such as stability problems in the design. The continuous production of two bottom products is not described.

SUMMARY

There is therefore a need for further improvements the field of the distillation of substance mixtures from which it is intended to obtain two or more liquid bottom products and one distillate. It was in particular desirable to be able to operate such a distillation operation without interruption as a result of changes in process parameters while dispensing with a dividing wall column that is complicated to control.

Taking this need into account, one subject of the present invention is a distillation unit (100 000) for the continuous separation of a liquid substance mixture (10) into n liquid product streams (201, 202, . . . 20n) of differing composition and a gaseous product stream (300), where n is a natural number in the range from 2 to 6,
wherein the distillation unit (100000) comprises
(I) an evaporation unit (10 000) for the partial evaporation of the liquid substance mixture (10) to be separated, with withdrawal of n liquid bottom streams (21, 22, . . . 2n) and 1 to n gas streams (31, 32, . . . 3n) from the evaporation unit (10 000),
(II) a distillation column (20 000) for obtaining the gaseous product stream (300), wherein the distillation column (20 000) is not a dividing wall column, and
(III) at least one feed device (1 100-1, 1 100-2, . . . 1 100-n) for introducing the liquid substance mixture (10) to be evaporated, wherein the at least one feed device (1100-1, 1100-2, . . . 1 100-n) leads
(IIIa) into the evaporation unit (10 000) or
(IIIb) into the distillation column (20 000),
and wherein in addition
(Ia) the evaporation unit (10 000) has n evaporation devices (10 000-1, 10 000-2, . . . 10000-n), from which the n liquid bottom streams (21, 22, . . . 2n) are withdrawn, wherein in the case (IIIa) at least one of the n evaporation devices is assigned a feed device (1 100-1, 1 100-2, . . . 1 100-n) for introducing the liquid substance mixture (10) to be evaporated,
wherein each of the n evaporation devices (10 000-1, 10 000-2, . . . 10 000-n) has a circulation device (1 200-1, 1 200-2, . . . 1 200-n) for recycling a first portion of each of the withdrawn n liquid bottom streams (21, 22, . . . 2n) into the respective evaporation device, wherein in addition each of these n circulation devices (1200-1, 1 200-2, . . . 1 200-n) has a discharge device (1 300-1, 1 300-2, . . . 1 300-n) for the continuous provision of one of the n liquid product streams (201, 202, . . . 20n), wherein each discharge device (1 300-1, 1 300-2, . . . 1 300-n) is fluidically connected to the respective circulation device (1 200-1, 1 200-2, . . . 1 200-n) such that a second portion of each of the n liquid bottom streams (21, 22, . . . 2n) is discharged via the discharge device (1 300-1, 1 300-2, . . . 1 300-n) (i.e. this second portion can be identical to the corresponding liquid product stream (201, 202, . . . 20n) or be a constituent thereof);
and
(IIa) the distillation column (20 000) has the following:
devices (2 100-1, 2 100-2, . . . 2 100-n) for receiving the 1 to n gas streams (31, 32, . . . 3n) withdrawn from the evaporation unit (10000),
devices (2200-1, 2 200-2, . . . 2 200-n) for recycling a liquid bottom stream from the distillation column (20 000) into at least one of the n circulation devices (1 200-1, 1200-2, . . . 1200-n), in the case (IIIb) into each of the n circulation devices (1200-1, 1 200-2, . . . 1 200-n), and
a discharge device (2300) for the continuous provision of the gaseous product stream (300), optionally in condensed form (310).

A further subject of the present invention is a continuously operated process for separating a liquid substance mixture (10) into n liquid product streams (201, 202, . . . 20n) of differing composition and a gaseous product stream (300), wherein n is a natural number in the range from 2 to 6, in which the separation is conducted in a distillation unit (100 000) according to the invention.

BRIEF DESCRIPTION OF THE DRAWINGS

FIG. 2b is a detailed drawing of FIG. 2a;

DESCRIPTION

Figure 1:
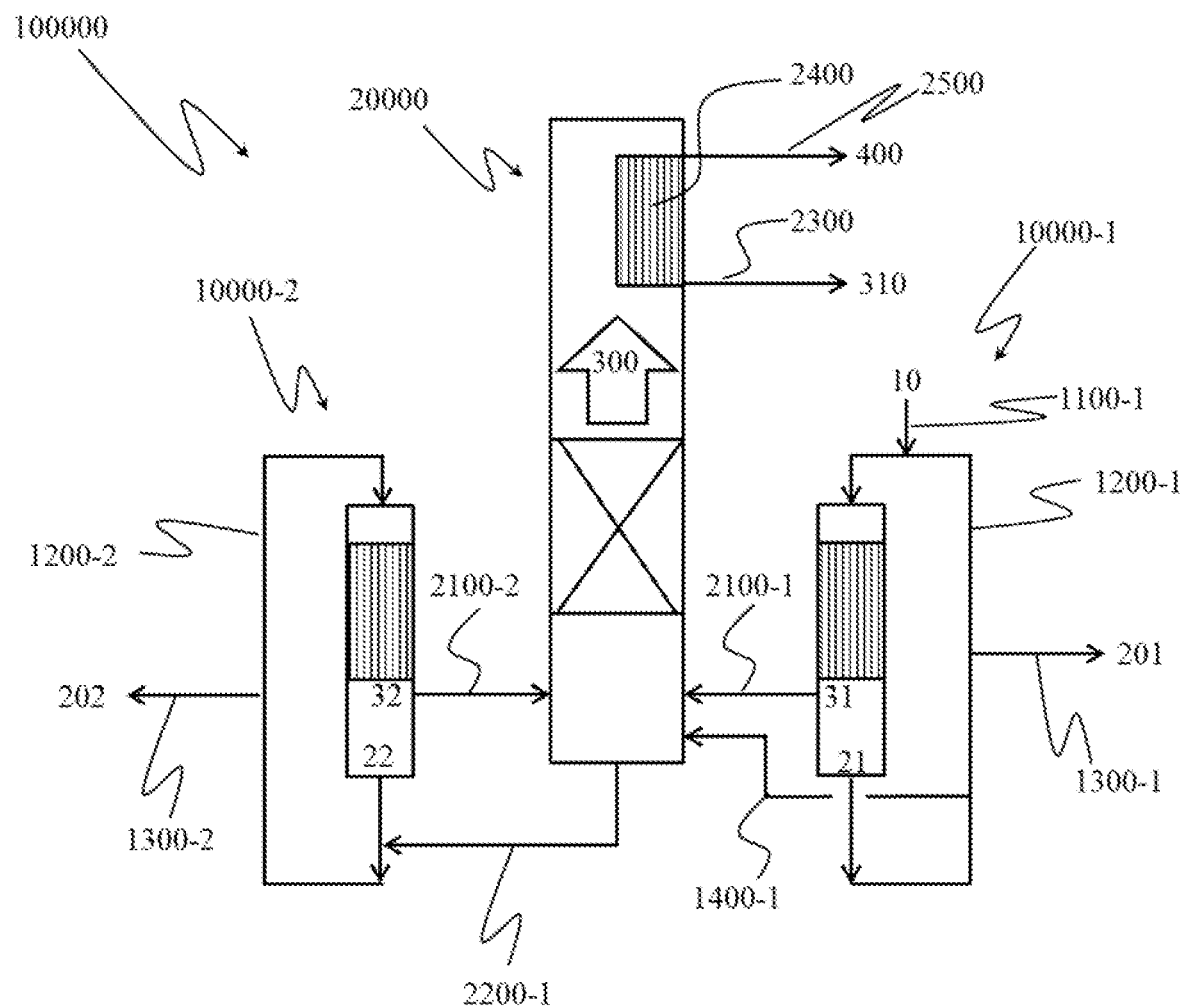
FIG. 1 shows a first variant of the distillation unit according to the invention with two evaporators (variant 1)

A "distillation unit (100000)" in the context of the invention consists at least of an "evaporation unit (10 000)" comprising n evaporation devices (10 000-1, 10 000-2, . . . 10 000-n), and a "distillation column (20 000)", and also the peripheral devices required for conducting the separation of matter (pipelines, pumps, condensers, heat exchangers and the like).

In the simplest case, the "n evaporation devices (10000-1, 10 000-2, . . . 10000-n)" are identical to n evaporators, as are known per se from the prior art, and the "evaporation unit (10 000)" is the totality of all n evaporators (variant 1). It is however also possible to subdivide one or more evaporators, in the manner described in more detail below, into a total of n chambers, which can then be understood to be the "n evaporation devices (10 000-1, 10 000-2, . . . 10 000-$n$)" in the context of the invention (variant 2). A combination of these two variants, i.e. the use of conventional evaporators and evaporators subdivided into chambers, is also possible, with the sum of all "conventional" evaporators used and the sum of all chambers then being equal to n (variant 3).

In the context of the invention, the "distillation column (20 000)" used can be the column-like apparatuses known from the prior art for the thermal separation of substances, which can be provided with any desired internals that increase the separation efficiency, but which according to the invention are not dividing wall columns. The target distillate sought is initially obtained in gas form as product stream (300) and can be continuously withdrawn from the distillation column via the discharge device (2 300) in gas form (300) and then condensed in a condenser. It is also possible to already integrate a condenser in the column body and to continuously withdraw the target distillate sought from the distillation column (20 000) already in liquid form as stream (310), as illustrated in the appended drawings.

In the context of the invention, feed, discharge and circulation devices and devices for receiving and recycling substance streams obtained during the distillation are devices known to those skilled in the art, such as in particular piping connection made from metal.

There first follows a brief summary of various possible embodiments of the invention:

In a first embodiment of the distillation unit according to the invention, the n evaporation devices (10000-1, 10 000-2, . . . 10000-$n$) are disposed in one or more evaporators, wherein each evaporator has two or more separate chambers for receiving the n liquid bottom streams (21, 22, . . . 2$n$) and the total number of all chambers is equal to n.

In a second embodiment of the distillation unit according to the invention, which is a preferred configuration of the first embodiment, case (IIIa) applies, wherein each of the n chambers is assigned a feed device (1 100-1, 1 100-2, . . . 1 100-$n$) for introducing the liquid substance mixture (10) to be evaporated.

In a third embodiment of the distillation unit according to the invention, which can be combined with all other embodiments, the devices (2 200-1, 2 200-2, . . . 2 200-$n$) for recycling a liquid bottom stream from the distillation column (20 000) do not lead into all of the n circulation devices (1 300-1, 1 300-2, . . . 1 300-$n$), n in particular being equal to 2.

In a fourth embodiment of the distillation unit according to the invention, the n evaporation devices (10000-1, 10000-2, . . . 10000-$n$) are n evaporators.

In a fifth embodiment of the distillation unit according to the invention, which is a preferred configuration of the fourth embodiment, case (IIIa) applies, wherein each of the n evaporators is assigned a feed device (1100-1, 1100-2, . . . 1 100-$n$) for introducing the liquid substance mixture (10) to be evaporated.

In a sixth embodiment of the distillation unit according to the invention, which is a further configuration of the fourth embodiment, case (IIIa) applies, wherein not every one of the n evaporators is assigned a feed device (1 100-1, 1 100-2, . . . 1 100-$n$) for introducing the liquid substance mixture (10) to be evaporated, wherein from each of the n evaporators that has a feed device (1100-1, 1100-2, . . . 1 100-$n$) leads a piping connection from the respective circulation device (1 200-1, 1 200-2, . . . 1 200-$n$) into the distillation column (20000).

In a seventh embodiment of the distillation unit according to the invention, a first portion of the n evaporation devices (10 000-1, 10 000-2, . . . 10 000-$n$) is disposed in one or more evaporators each having two or more separate chambers for receiving liquid bottom streams (21, 22, . . . ), wherein a second portion of the n evaporation devices (10000-1, 10000-2, . . . 10000-$n$) consists of evaporators, n in particular being equal to 3.

In an eighth embodiment of the distillation unit according to the invention, which can be combined with all embodiments in which evaporators having two or more separate chambers for receiving the n liquid bottom streams (21, 22, . . . 2$n$) are used, the chambers of an evaporator are of different sizes.

In a ninth embodiment of the distillation unit according to the invention, which can be combined with all embodiments, at least one of the n circulation devices (1 200-1, 1 200-2, . . . 1 200-$n$) has a controllable feed piping connection (1 500-1, 1 500-2, . . . ) into one or more of the other n circulation devices (1 200-1, 1 200-2, . . . 1 200-$n$), wherein at least the circulation devices (1 200-1, 1 200-2, . . . 1 200-$n$) having such a feed piping connection are configured such that the feed flow from the circulation devices (1 200-1, 1 200-2, . . . 1 200-$n$) in question into the respective evaporation devices (10000-1, 10000-2, . . . 10000-$n$) is controllable.

In a tenth embodiment of the distillation unit according to the invention, which can be combined with all embodiments, the evaporation unit (10000) comprises a thin-film evaporator and/or a falling-film evaporator, where in particular all evaporators used are falling-film evaporators.

In a first embodiment of the process according to the invention, case (IIIa) applies, wherein the liquid bottom stream from the distillation column (20 000) is not recycled into all of the n circulation devices (1200-1, 1200-2, . . . 1200-$n$), wherein at least that one of the n circulation devices (1200-1, 1 200-2, . . . 1 200-$n$) through which the liquid product stream having the lowest viscosity (and hence being the least concentrated) of all liquid product streams (201, 202, . . . 20$n$) is provided is supplied with liquid bottom stream from the distillation column (20 000), and wherein any devices (2 200-1, 2 200-2, . . . 2 200-$n$) present that are not being used for recycling liquid bottom stream from the distillation column (20 000) are shut off.

In a second embodiment of the process according to the invention, which can be combined with all other embodiments, provided they do not relate to the separation of substance mixtures other than those of di- and polyamines of the diphenylmethane series, the liquid substance mixture (10) comprises a mixture of di- and polyamines of the diphenylmethane series, which are separated into n liquid product streams (201, 202, . . . 20$n$) comprising mixtures of di- and polyamines of the diphenylmethane series each with a different content of diamines of the diphenylmethane series and a gaseous product stream (300) comprising diamines of the diphenylmethane series.

In a third embodiment of the process according to the invention, which can be combined with all other embodiments, provided they do not relate to the separation of substance mixtures other than those of di- and polyisocyanates of the diphenylmethane series, the liquid substance mixture (10) comprises a mixture of di- and polyisocyanates of the diphenylmethane series, which are separated into n liquid product streams (201, 202, . . . 20$n$) comprising mixtures of di- and polyisocyanates of the diphenylmethane series each with a different content of diisocyanates of the diphenylmethane series and a gaseous product stream (300) comprising diisocyanates of the diphenylmethane series.

In a fourth embodiment of the process according to the invention, which can be combined with all other embodiments, in particular with the second and third embodiments, n=2 or 3.

The embodiments outlined briefly above and further possible configurations of the invention are elucidated in more detail hereinafter. All embodiments and further configurations of the invention can be combined with one another as desired, unless expressly stated otherwise or unless the opposite is clearly evident to a person skilled in the art from the context.

Figure 2A:
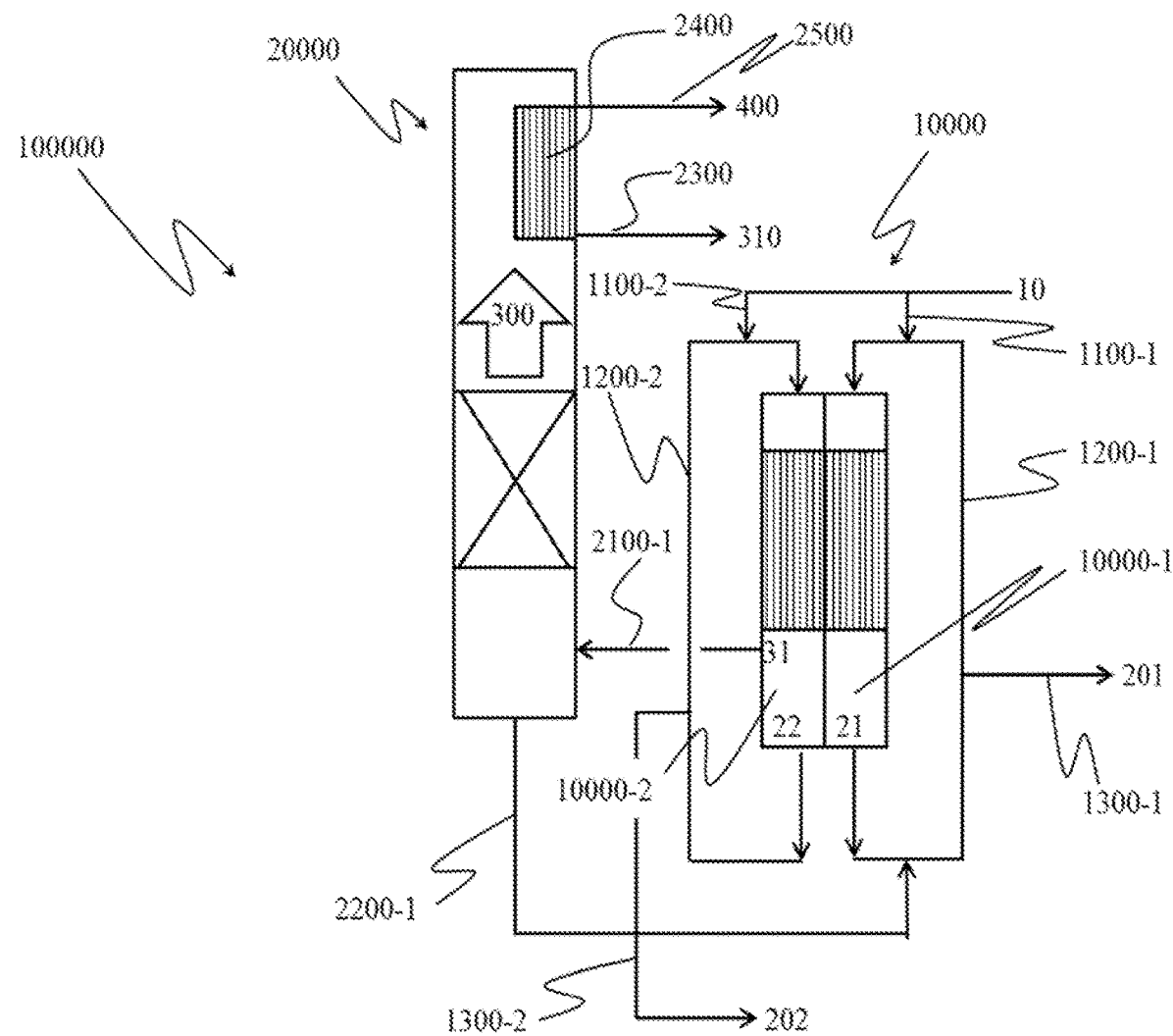
FIG. 2a shows a second variant of the distillation unit according to the invention with an evaporator divided into two chambers (variant 2)
Figure 2B:
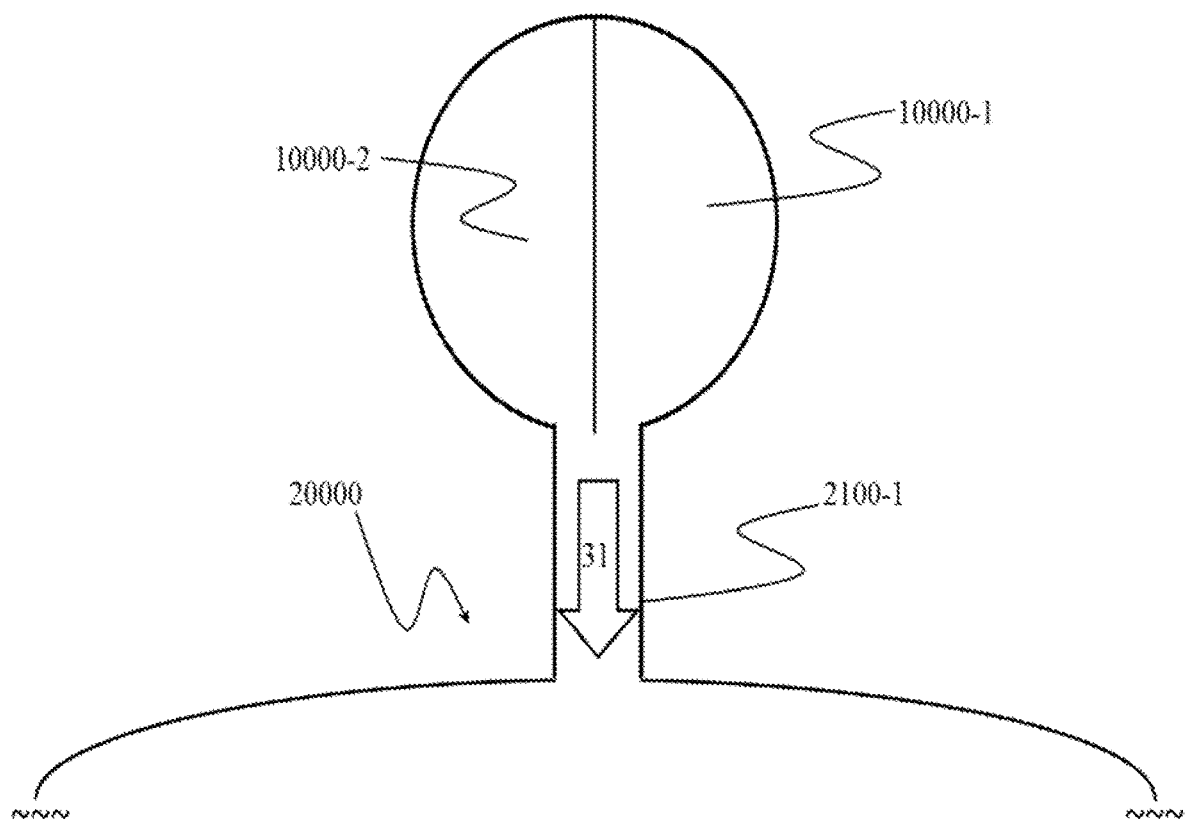
Figure 3:
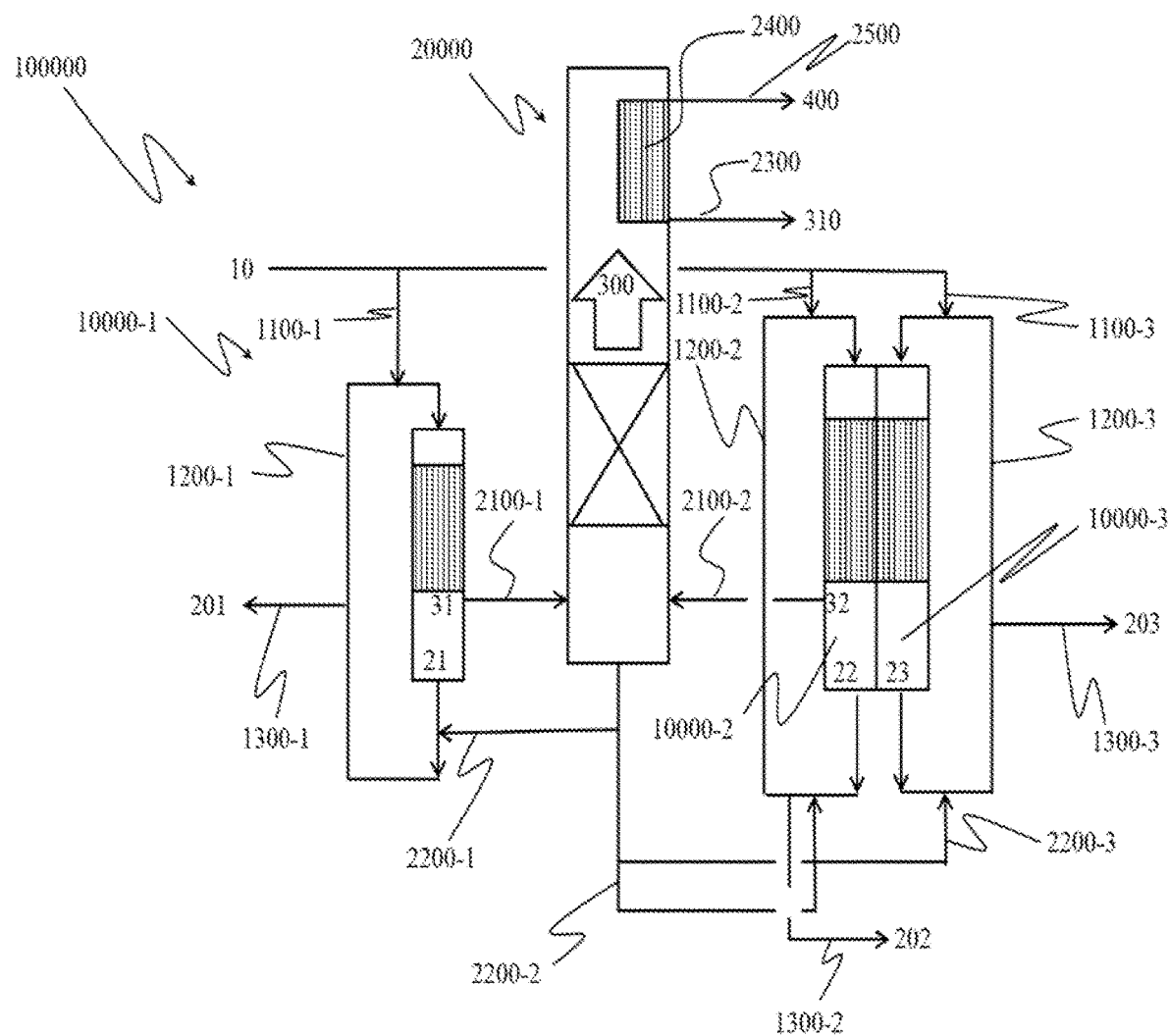
FIG. 3 shows a combination of variant 1 and variant 2 (variant 3)

The figures FIG. 1, FIG. 2*a,b* and FIG. 3 show the three basic variants of the distillation unit (100 000) according to the invention for case (IIIa). FIG. 1 shows the variant with two evaporators (variant 1), FIG. 2*a* the variant with an evaporator divided into two chambers (variant 2; FIG. 2*b* is a detailed drawing of FIG. 2*a*) and FIG. 3 the combination of these two variants (variant 3). In all drawings, peripheral devices such as pumps, valves and the like have been omitted for the sake of simplicity of the drawing.

In the embodiment according to FIG. 1, the feed stream of the substance mixture (10) to be separated is conducted into one of the two evaporators, on the right in the drawing (10000-1), and specifically in such a way that the feed device (1 100-1) opens into the circulation device of this evaporator (10 000-1), here the circulation device 1 200-1. The substance stream flows through the evaporator (10 000-1)—here a falling-film evaporator—from top to bottom and is partially evaporated in the region of the heating tube. The resulting gaseous stream (31), which may also contain fractions of entrained unevaporated liquid, is supplied to the distillation column (20 000) via the device (2 100-1). A further separation of the stream (31) (and of the other streams introduced into the column) takes place in the distillation column (20 000). The resulting gas phase (300) rising upwards is condensed in an internal condenser (2 400) in the top region of the distillation column (20000) and discharged via the discharge device (2 300) as condensed top product (310). Uncondensed fractions (for example inert gases such as nitrogen) leave the top condenser via piping connection (2500) as gas stream (400). If the distillation is operated under vacuum, the gas stream (400) is sucked into the vacuum system. Of course, it is also possible to withdraw the gaseous stream (300) from the distillation column (20 000) via the discharge device (2 300) and to condense it outside of the column body. This applies to all variants and embodiments of the present invention. A first portion of the unevaporated residual liquid (21) of the evaporator (10 000-1) is recycled via the circulation device (1 200-1) to the top of the evaporator. A second portion of the unevaporated residual liquid (21) is discharged via the discharge device (1 300-1) and constitutes the first liquid product stream (201). In this case, therefore, the product (201) is identical to the liquid bottoms discharge (21) of the evaporator (10 000-2). If, as is shown in FIG. 1, the feed stream of the substance mixture (10) to be separated is delivered to only one of the evaporators, it is preferable to conduct a third portion of the liquid stream (21) out of the circulation device (1 200-1) assigned to this evaporator via the device 1 400-1 into the bottom of the distillation column (20 000) (below the point for addition of the gas stream 31 via the device 2 100-1). In this way, the liquid bottom product is ultimately also introduced into the other evaporator (in the drawing 10 000-2).

The liquid bottom product of the distillation column (20 000) is conducted via the device (piping connection) 2200-1 into the circulation device (1 200-2) of the evaporator (10 000-2). In the embodiment shown, this occurs at a point that is fluidically upstream of the connection of the discharge device (1 300-2) to the circulation device (1 200-2). This has the advantage that a delivery pump for the bottom stream of the distillation column (20 000) can be dispensed with. In the circulation device (1 200-2), the liquid bottom product of the distillation column (20 000) mixes with the liquid bottom product (22) of the evaporator (10 000-2). A first portion of the resulting mixture is conducted via the circulation device (1 300-2) to the top of the evaporator; a second portion is discharged via the discharge device (1 300-2) as second liquid product stream (202). In this case, the product (202) is therefore not identical to the liquid bottoms discharge (22) of the evaporator (10 000-2) but instead is a mixture of the latter with the liquid bottom stream of the distillation column (20 000). In this case, the stream recycled to the top of the evaporator is also not identical to the liquid bottoms discharge (22) of the evaporator (10 000-2); it is likewise a mixture of the latter with the liquid bottom stream of the distillation column (20 000). The first and the second portions of the liquid bottom stream (here 22) of the evaporation device (here 10 000-2) in this embodiment are thus constituents of the liquid product stream (here 202) and of the stream recycled into the evaporation device (here 10 000-2) via the circulation device (here 1 200-2). This is expressly encompassed by the features of the invention "wherein each of the n evaporation devices (10 000-1, 10 000-2, . . . 10 000-*n*) has a circulation device (1200-1, 1 200-2, . . . 1 200-*n*) for recycling a first portion of each of the withdrawn n liquid bottom streams (21, 22, . . . 2*n*) into the respective evaporation device, wherein in addition each of these n circulation devices (1200-1, 1 200-2, . . . 1 200-*n*) has a discharge device (1300-1, 1 300-2, . . . 1 300-*n*) for the continuous provision of one of the n liquid product streams (201, 202, . . . 20*n*), wherein each discharge device (1 300-1, 1 300-2, . . . 1 300-*n*) is fluidically connected to the respective circulation device (1 200-1, 1 200-2, . . . 1 200-*n*) such that a second portion of each of the n liquid bottom streams (21, 22, . . . 2*n*) is discharged via the discharge device (1300-1, 1 300-2, . . . 1 300-*n*)" and can be realised in all variants of the invention.

The liquid mixture charged at the top of the evaporator (10 000-2) via the circulation device (1 200-2) passes through the evaporator from top to bottom and is partially evaporated. The resulting gaseous stream (32), which may also contain fractions of entrained unevaporated liquid, is supplied to the distillation column (20 000) via the device (2 100-2). There, the separation into the gaseous product stream (300) and the liquid distillation bottom stream takes place.

The embodiment shown in FIG. 1 is one of a plurality of possibilities for implementing variant 1 of the invention. Further configurations are encompassed by the invention. For instance, in a deviation from the embodiment specifically shown in FIG. 1, it is possible to supply the substance stream (10) to both (i.e. all) evaporators (10 000-1, 10 000-2). Likewise, the liquid bottom stream of the distillation column (20 000) can be supplied to the circulation devices (1 200-1, 1 200-2) of both evaporators. These two embodiments are preferably combined. In a deviation from what is shown in FIG. 1, it is also possible to conduct the bottom stream of the distillation column (20 000) via the device (piping connection) 2200-1 to a point of the circulation device (1 200-2) that is fluidically downstream of the connection of the discharge device (1 300-2) to the circulation device (1 200-2). This has the advantage that the bottom stream (22) of the evaporator (10 000-2) can be better concentrated. In this embodiment, however, a delivery pump is generally required for the bottom stream of the distillation column (20 000).

Irrespective of the chosen variant, there are in principle always the following two possibilities: Recycling the bottom stream of the distillation column (20 000) to a point of the circulation device (1 200-2), which lies fluidically (i) downstream or (ii) upstream of the connection of the discharge device (1 300-2) to the circulation device (1 200-2). Which of the two options is the better one depends on the boundary conditions and requirements of the individual case.

In the embodiment according to FIG. 2a, an evaporation unit (10 000) is used which has two evaporation devices (10000-1, 10 000-2). The evaporation unit (10000) is in this case an evaporator (a falling-film evaporator is shown here) which by installation of a separating plate is subdivided into two chambers each of which constitutes an evaporation device (10000-1, 10 000-2) according to the invention. The reference symbols otherwise have the same meaning as described above for FIG. 1. The feed stream of the substance mixture (10) to be separated is distributed to both of these evaporation devices (10 000-1, 10 000-2).

Each evaporation device (10 000-1, 10 000-2) is, as in the embodiment according to FIG. 1, assigned its own circulation device (1 200-1 or 1 200-2) from which the respective liquid product stream (201 or 202) is withdrawn. The separating plate is shown in FIG. 2 offset by 900 for drawing reasons. FIG. 2b shows a cross section immediately below the heating tube of the falling-film evaporator in plan view, in which the true attachment of the device (2 100-1) on the evaporation unit (10 000) is illustrated. As a result of the depicted arrangement of the device (2 100-1) with respect to the separating plate, it becomes possible for a gas phase (31) common to both evaporation devices (10000-1, 10 000-2) to be withdrawn from the evaporation unit (10 000) and supplied to the distillation column (20 000). The liquid bottom product of the distillation column (20 000) is conducted via the device (piping connection) 2200-1 into the circulation device (1 200-2) of the evaporation device (10000-1).

The embodiment shown in FIG. 2a,b is one of a plurality of possibilities for configuring variant 2 of the invention. Further configurations are encompassed by the invention. For instance, in a deviation from the embodiment specifically shown in FIG. 2a, it is possible to supply the substance stream (10) to only one of the two evaporation devices (10 000-1, 10 000-2). This can also be realized in a preferred manner by still providing a feed device (1100-1, 1 200-2) for each evaporation device (10 000-1, 10000-2), but shutting off one of them by closing a valve (this is of course likewise possible when using evaporators that are not subdivided into chambers, as in variant 1 and variant 3). Likewise, the liquid bottom stream of the distillation column (20 000) can be supplied to the circulation devices (1 200-1, 1 200-2) of both evaporators. It is not mandatory, as shown in FIG. 2a, for the separating plate to extend over the entire internal volume of the evaporator. A subdivision into chambers only in the region of the liquid bottoms is in principle also sufficient. Nor does the separating plate necessarily have to be arranged centrally as shown in FIG. 2a. Depending on the separating task, a lateral offset of the separating plate may be expedient, so as to give chambers of differing size and heat exchange area. This enables establishing different substance concentrations in the individual chambers.

Figure 4:
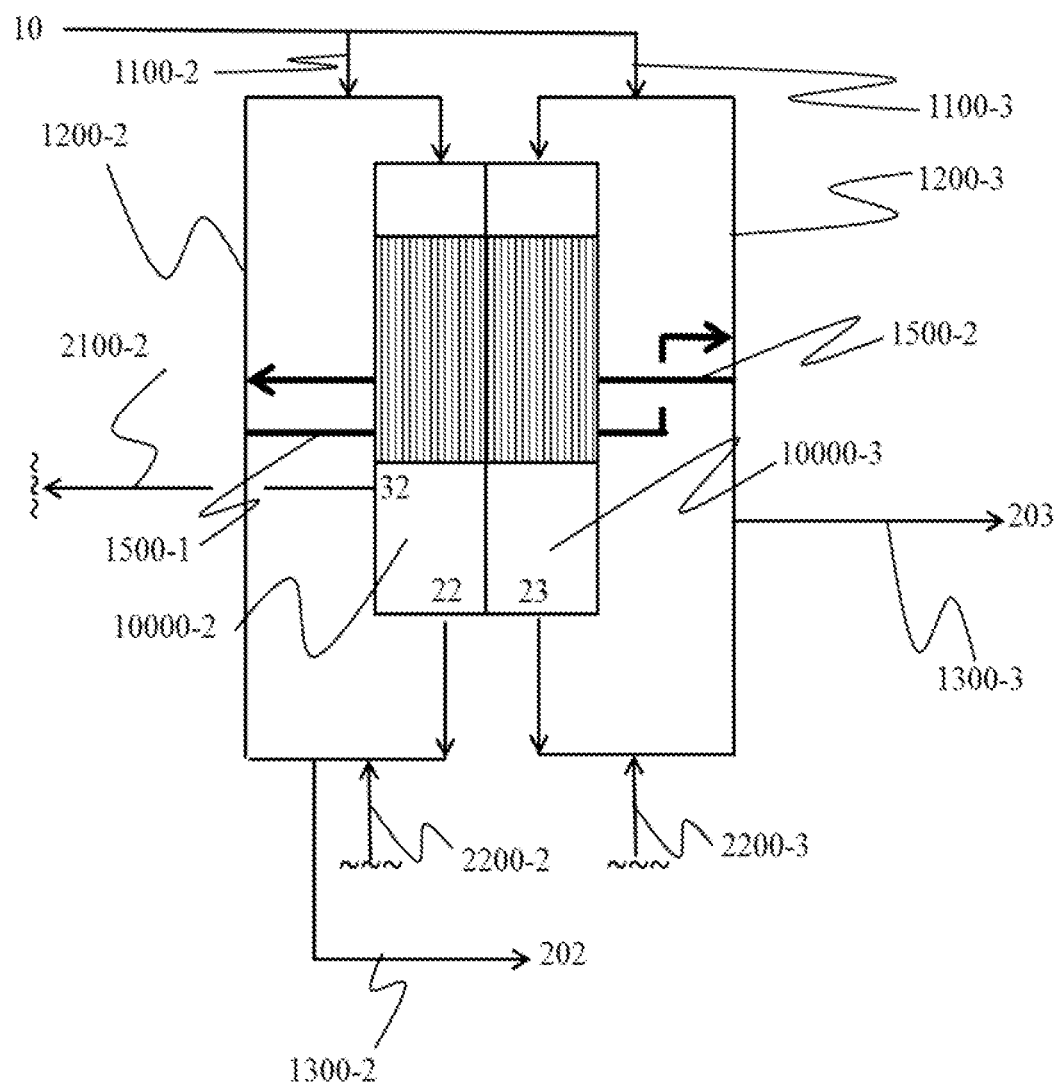
FIG. 4 shows an embodiment of the invention with overflow piping connections (1 500-1 and 1 500-2) using the example of the embodiment according to FIG. 3 in a detail enlargement.

Compared to the embodiment shown in FIG. 1, the embodiment according to FIG. 2a,b has the advantage of simplification of the equipment and hence a reduction in investment costs. Existing distillation systems may also be relatively easily retrofitted with the embodiment according to FIG. 2a,b, since no additional space for a further evaporator is required and the condensation unit is not affected by such retrofits. The same applies to the above-described modifications to the embodiment according to FIG. 2a,b, specifically even if, as shown in FIG. 4, overflow piping connections (1500-1, 1 500-2; see the explanations further below in connection with FIG. 4) are present.

The embodiment according to FIG. 3 represents a combination of the embodiments according to FIG. 1 and FIG. 2a,b, which is suitable for obtaining n=3 liquid product streams (201, 202, 203). For this purpose, the evaporation unit (10 000) comprises a "standard" evaporator (10 000-1) and a second evaporator that is subdivided into two chambers (10 000-1, 10 000-2). Alternatively, n=3 liquid product streams (201, 202, 203) may also be obtained by using three evaporators in variant 1 or one evaporator with three chambers in variant 2. By contrast, the embodiment according to FIG. 3 has the advantage that the evaporator (10 000-1) can be operated independently of the other evaporators. This enables high process stability in the event of high concentrations and load changes.

The embodiment shown in FIG. 3 is one of a plurality of possibilities for configuring variant 3 of the invention. The deviations, discussed above for variants 1 and 2, from the embodiments specifically shown in the figures can also be applied in variant 3.

In all variants of the invention, it may be expedient, irrespective of the precise separating task, for at least one of the n circulation devices (1200-1, 1200-2, . . . 1200-n) to be equipped with a controllable (up to and including complete shutoff) feed piping connection into one or more of the other n circulation devices (1 200-1, 1 200-2, . . . 1 200-n), wherein at least the circulation devices (1 200-1, 1200-2, . . . 1 200-n) having such a feed piping connection are configured such that the feed flow from the circulation devices (1 200-1, 1 200-2, . . . 1 200-n) in question into the respective evaporation devices (10000-1, 10000-2, . . . 10000-n) is controllable (up to and including complete shutoff). This is shown in FIG. 4 using the example of the embodiment according to FIG. 3 in a detail enlargement (illustrated by the thick arrows—overflow piping connections—1 500-1, 1 500-2; the valves required for the control are not shown for the sake of simplicity). This embodiment is advantageous in particular when the intention is to operate the distillation in a particularly flexible manner. The procedure described specifically enables the amount of bottom product formed in one evaporation chamber (for example 10 000-2) to be altered within certain limits, without excessively influencing the bottom product formed in the other evaporation chamber (in the example 10 000-3). If the substance mixture (10) to be separated in the embodiment according to FIG. 4 is for example concentrated more strongly in the evaporation device (10 000-2) (for example as a result of a heat input into the evaporation devices that differs with respect to the feed amount) than in the evaporation device (10 000-3), and the amount of more strongly concentrated liquid product (202) is then to be reduced, this can be achieved as follows:

The output of the liquid product stream 202 via the device 1 300-2 is reduced in accordance with the lowered demand, with the amount of liquid product stream 202 that is now no longer being output via the device 1 300-2 being conducted via the overflow piping connection 1 500-1 into the other evaporation device (10 000-3). In order to avoid an undesired change in the composition of the liquid product stream (203) obtained there, the evaporator duty is reduced.

Irrespective of the variant used, it is preferable for the evaporation unit (10 000) to comprise a thin-film evaporator and/or a falling-film evaporator. In particular, it is preferable for all evaporators used (irrespective of whether they are "conventional" evaporators or evaporators subdivided into chambers) to be falling-film evaporators. Falling-film evaporators are characterized by a low thermal stress and short residence time at the heating surfaces.

However, other evaporator types are also conceivable in principle. All that is essential is that the n liquid bottom streams (21, 22, . . . 2n)—with the possible exception of the above-discussed configuration with overflow piping connections (1 500-1, 1 500-2, . . .)—are kept separate from one another.

With the exception of the subdivision of an evaporator into two or more evaporation chambers used in variant 2 and variant 3, the falling-film evaporators particularly preferred in accordance with the invention can be of the exact same construction as that well known from the prior art. Falling-film evaporators generally comprise at least the following technical units, which are preferably also realized in the present invention:

an outer, enveloping shell,
a plurality of tubes (known as tube bundle), which are secured in an upper and a lower tube sheet,
a top-side distributor apparatus for distributing the liquid to be evaporated into the individual tubes,
a device for feeding a heating medium, preferably steam, pressurized water, oil or a molten salt, especially steam, into the tube exterior space formed by the outside of the tubes and the shell,
a device for discharging cooled heating medium, especially condensed water, from the tube exterior space,
a gas extraction device for evaporated liquid produced inside the tubes (corresponding to the n gas streams 31, 32, . . . 3n),
a liquid extraction device for unevaporated residual liquid in the tubes (corresponding to the n liquid bottom streams 21, 22, . . . 2n).

The variants and embodiments described so far are equally applicable to case (IIIb).

A further subject of the present invention is a continuously operated process for separating a liquid substance mixture (10) into n liquid product streams (201, 202, . . . 20n) of differing composition and a gaseous product stream (300), wherein n is a natural number in the range from 2 to 6, in which the separation is conducted as described above in a distillation unit (100 000) according to the invention.

The substance mixture to be separated is conducted via the at least one feed device (1100-1, 1100-2, . . . 1 100-n) into the evaporation unit (10 000) (case (IIIa); see above) or into the distillation column (20000) (case (IIIb); see above). In the evaporation unit (10000), the liquid substance mixture (10) to be separated is partially evaporated, while in the distillation column (20 000) the gaseous product stream (300) is obtained. The n liquid product streams (201, 202, . . . 20n) are in this case discharged via the discharge device (1 300-1, 1 300-2, . . . 1 300-n). The gaseous product stream (300) is withdrawn from the distillation column (20 000) either as such or in a condensed form (310) via the discharge device (2 300). For possible configurations and modes of operation of the distillation unit (100000) in the process according to the invention, reference is made in full to the above description of the apparatus and the associated drawings. What has been said there applies equally to the process according to the invention and is therefore not repeated at this juncture.

Suitable temperatures and pressures for conducting the process according to the invention can be easily determined for any given separating task by those skilled in the art on the basis of their technical knowledge, possibly together with the performance of simple preliminary experiments.

In a preferred embodiment of the process according to the invention, the substance mixture (10) to be separated is fed into the evaporation unit (10 000), wherein the liquid bottom stream from the distillation column (20 000) is not recycled into all of the n circulation devices (1 200-1, 1 200-2, . . . 1200-n) (as also shown in FIG. 2a), wherein in particular that one of the n circulation devices (1200-1, 1 200-2, . . . 1 200-n) by which the liquid product stream having the lowest viscosity (and hence being the least concentrated) of all liquid product streams (201, 202, . . . 20n) is provided, is supplied with liquid bottom stream from the distillation column (20 000), wherein any devices (2 200-1, 2 200-2, . . . 2 200-n) present that are not being used for recycling liquid bottom stream from the distillation column (20 000) are then shut off (not shown in FIG. 2a).

The process according to the invention is particularly suitable for separating diamines or diisocyanates of the diphenylmethane series from the corresponding liquid substance mixtures (10) comprising, in addition to the diamines or diisocyanates, the corresponding higher homologs, the polyamines or polyisocyanates of the diphenylmethane series. The mixtures of di- and polyamines of the diphenylmethane series are also referred to as MDA, and the mixtures of di- and polyisocyanates of the diphenylmethane series are correspondingly also referred to as MDI.

Diamines of the diphenylmethane series are understood to be compounds of the following type with n=2, whereas the polyamines of the diphenylmethane series denote the higher homologs with n>2:

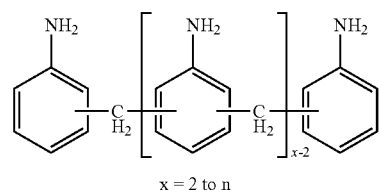

x = 2 to n

Analogously, diisocyanates of the diphenylmethane series are understood to be compounds of the following type with n=2, whereas the polyisocyanates of the diphenylmethane series denote the higher homologs with n>2:

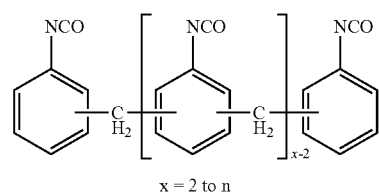

x = 2 to n

The preparation of the di- and polyamines of the diphenylmethane series and from them the corresponding isocyanates by phosgenation is well known. The mixture of di- and polyamines of the diphenylmethane series obtained in the preparation of the amines is usually not separated, but is phosgenated as such and thus converted into MDI. However, if a separation is desired as early as at the amine stage, for example in order to prepare pure diamine of the diphenylmethane series (also referred to as "two-ring MDA"), this can be done in a preferred manner using the process according to the invention. The mixture of di- and polyamines of the diphenylmethane series to be separated can be provided by any method known from the prior art. Reference may for example be made to the method described in WO 2015/197527 A1 comprising steps IA), IIA) or IB), IIB), and III to VII) (see in particular page 10, line 11 to page 13, line 25 and page 25, lines 3 to 28), shown graphically in FIG. 1, as well as to the literature cited in this patent application. Of course, the optional step VIII) described in WO 2015/197527 A1 can also be performed.

However, since in most industrial processes a separation into "dimer" and "higher homologs" does not take place until the isocyanate stage, the corresponding separation at this point (also referred to as "polymer separation", PMS) is the preferred area of application for the process according to the invention. The mixture of di- and polyisocyanates of the diphenylmethane series to be separated can be provided by any desired method known from the prior art. Reference may for example be made to the method described in WO 2017/050776 A1 comprising steps I) to IX) (see in particular page 11, line 17 to page 14, line 7 and page 35, line 2 to page 37, line 9), shown graphically in FIG. 1, as well as to the literature cited in this patent application. In the terminology of the application WO 2017/050776 A1, the distillation unit (100 000) according to the invention replaces the "unit for separating polymeric isocyanate fractions (2410)".

If the process according to the invention is used in the separation of a mixture of di- and polyisocyanates of the diphenylmethane series, then n liquid product streams (201, 202, . . . 20*n*) are obtained comprising mixtures of di- and polyisocyanates of the diphenylmethane series each having a different content of diisocyanates of the diphenylmethane series. The gaseous product stream (300) separated off in this case comprises diisocyanates of the diphenylmethane series (and also low-boiling secondary components and possibly minor fractions of (OCN)C$_6$H$_4$CH$_2$C$_6$H$_3$(NCO) CH$_2$C$_6$H$_4$(NCO) (referred to as "three-ring MDI", which may be "entrained" in small proportions during the distillation in the distillation column (20 000)). The process according to the invention makes possible the simultaneous obtaining of n=2 or more, preferably of n=2 or 3, mixtures comprising di- and polyisocyanates of the diphenylmethane series, which are characterized by a differing content of polyisocyanates of the diphenylmethane series and hence differing viscosities. This is achieved by the fact that, in the n evaporation devices (10000-1, 10 000-2, . . . 10 000-*n*) that are to be used according to the invention and in which the n mixtures comprising di- and polyisocyanates of the diphenylmethane series ("polymer MDI") are obtained, the liquid substance mixture (10) is concentrated to different degrees, which, as a consequence of the high boiling point differences, has at the most a minor effect, if any, on the composition of the distillate phase (300 or 310)—the diisocyanates of the diphenylmethane series. In this way, the continuous provision of two or more "polymer MDI fractions" (the mixtures of di- and polyisocyanates of the diphenylmethane series that are separated off as liquid bottom products (201, 202, . . .) is possible, without impairing the quality of the "monomer fraction" (the diisocyanates of the diphenylmethane series separated off as distillate phase 300 or 310).

Mixtures of di- and polyisocyanates of the diphenylmethane series having the following composition are preferably used as substance mixtures (10):

30% by mass to 55% by mass of polyisocyanates of the diphenylmethane series and 45% by mass to 70% by mass of diisocyanates of the diphenylmethane series, based in each case on the total mass of the substance mixture (10) to be separated.

In particular, it is possible with the process according to the invention (for example in an embodiment according to FIG. 1 or FIG. 2*a,b*) to provide liquid product mixtures (201, 202, . . .), the composition of which is preferably in the following range:

40% by mass to 75% by mass of polyisocyanates of the diphenylmethane series and 25% by mass to 60% by mass of diisocyanates of the diphenylmethane series, based in each case on the total mass of the liquid product mixture (201, 202, . . .).

Three MDI types that can be obtained by the process according to the invention (approximate values) are mentioned as examples:
1. 47% by mass of polyisocyanates of the diphenylmethane series and 53% by mass of diisocyanates of the diphenylmethane series, based in each case on the total mass of all di- and polyisocyanates in the liquid product mixture (201, 202, . . .). "Medium" viscosity MDI.
2. 54% by mass of polyisocyanates of the diphenylmethane series and 46% by mass of diisocyanates of the diphenylmethane series, based in each case on the total mass of all di- and polyisocyanates in the liquid product mixture (201, 202, . . .). "Higher" viscosity MDI.
3. 68% by mass of polyisocyanates of the diphenylmethane series and 32% by mass of diisocyanates of the diphenylmethane series, based in each case on the total mass of all di- and polyisocyanates in the liquid product mixture (201, 202, . . .). "High" viscosity MDI.

It is possible with the process according to the invention to obtain all three MDI types simultaneously (for example with an embodiment according to FIG. 3) or only two of them (for example with an embodiment according to FIG. 1 or FIG. 2*a,b*).

In all cases, the composition of the distillate phase obtained in the distillation column (20 000) after condensation is preferably in the following range:

99.800% by mass to 99.999% by mass of diisocyanates of the diphenylmethane series, based on the total mass of the condensed distillate stream (310).

Besides the diisocyanates of the diphenylmethane series, the distillate stream (310) may also still contain traces of low-boiling impurities (such as for example phenyl isocyanate or solvent not completely separated off beforehand) as well as extremely low proportions (not more than 0.010% by mass, based on the total mass of the condensed distillate stream (310)), of entrained tricyclic MDI.

The preferred application according to the invention of the distillation unit (100 000) according to the invention in a process for the partial separation of diisocyanates of the diphenylmethane series (300, 310) from substance mixtures (10) of di- and polyisocyanates of the diphenylmethane series to obtain a plurality of, in particular 2 or 3, liquid product streams (201, 202, . . .) comprising mixtures of di- and polyisocyanates of the diphenylmethane series each with a different proportion of diisocyanates of the diphenylmethane series, is preferably conducted under the following conditions:

Temperature in the bottom of the evaporation unit (10 000): 200° C. to 240° C., preferably 205° C. to 225° C.;
Top pressure (absolute) of the distillation column (20 000): 1 mbar to 20 mbar, preferably 4 mbar to 8 mbar;
Temperature in the bottom of the distillation column (20 000): 200° C. to 227° C.;
Condensation temperature (300→310): 80° C. to 210° C., preferably 140° C. to 170° C.

The invention has at least the following advantages:
Possibility of the simultaneous production of two or more bottom products without the formation of off-spec material.
Reduced complexity of equipment and accompanying reduced investment costs compared to the operation of two or more distillation columns.
The controllability is simplified compared to the operation of a dividing wall column having a dividing wall that extends down to the column base and two reboilers.

The invention claimed is:

1. A distillation unit (100 000) for continuously separating a liquid substance mixture (10) into n liquid product streams (201, 202, . . . 20n) of differing composition and a gaseous product stream (300), where n is a natural number in the range from 2 to 6,
   wherein the distillation unit (100 000) comprises
   (I) an evaporation unit (10 000) for partially evaporating the liquid substance mixture (10) to be separated, with withdrawal of n liquid bottom streams (21, 22, . . . 2n) and 1 to n gas streams (31, 32, . . . 3n) from the evaporation unit (10 000),
   (II) a distillation column (20 000) for obtaining the gaseous product stream (300), wherein the distillation column (20 000) is not a dividing wall column, and
   (III) at least one feed device (1 100-1, 1 100-2, . . . 1 100-n) for introducing the liquid substance mixture (10) to be evaporated, wherein the at least one feed device (1 100-1, 1 100-2, . . . 1 100-n) leads
   (IIIa) into the evaporation unit (10 000) or
   (IIIb) into the distillation column (20 000),
   and wherein in addition
   (Ia) the evaporation unit (10 000) has n evaporation devices (10 000-1, 10 000-2, . . . 10 000-n), from which the n liquid bottom streams (21, 22, . . . 2n) are withdrawn, wherein in the case (IIIa) at least one of the n evaporation devices is assigned a feed device (1 100-1, 1 100-2, . . . 1 100-n) for introducing the liquid substance mixture (10) to be evaporated,
   wherein each of the n evaporation devices (10 000-1, 10 000-2, . . . 10 000-n) has a circulation device (1 200-1, 1 200-2, . . . 1 200-n) for recycling a first portion of each of the withdrawn n liquid bottom streams (21, 22, . . . 2n) into the respective evaporation device, wherein each of the n circulation devices (1 200-1, 1 200-2, . . . 1 200-n) has a discharge device (1 300-1, 1 300-2, . . . 1 300-n) for continuously discharging one of the n liquid product streams (201, 202, . . . 20n), wherein each discharge device (1 300-1, 1 300-2, . . . 1 300-n) is fluidically connected to the respective circulation device (1 200-1, 1 200-2, . . . 1 200-n) such that a second portion of each of the n liquid bottom streams (21, 22, . . . 2n) is discharged via the discharge device (1 300-1, 1 300-2, . . . 1 300-n);
   and
   (IIa) the distillation column (20 000) comprises:
   devices (2100-1, 2100-2, . . . 2 100-n) for receiving the 1 ton gas streams (31, 32, . . . 3n) withdrawn from the evaporation unit (10 000),
   devices (2 200-1, 2200-2, . . . 2 200-n) for recycling a liquid bottom stream from the distillation column (20 000) into at least one of the n circulation devices (1 200-1, 1 200-2, . . . 1 200-n), in the case (IIIb) into each of the n circulation devices (1 200-1, 1 200-2, . . . 1 200-n), and
   a discharge device (2 300) for continuously discharging the gaseous product stream (300), optionally in condensed form (310).

2. The distillation unit (100 000) as claimed in claim 1, in which the n evaporation devices (10 000-1, 10 000-2, . . . 10 000-n) are disposed in one or more evaporators, wherein each evaporator has two or more separate chambers for receiving the n liquid bottom streams (21, 22, . . . 2n) and the total number of all chambers is equal to n.

3. The distillation unit (100 000) as claimed in claim 2, in which case (IIIa) applies and each of the n chambers is assigned a feed device (1 100-1, 1 100-2, . . . 1 100-n) for introducing the liquid substance mixture (10) to be evaporated.

4. The distillation unit (100 000) as claimed in claim 2, in which the devices (2 200-1, 2200-2, . . . 2 200-n) for recycling a liquid bottom stream from the distillation column (20 000) do not lead into all of the n circulation devices (1 300-1, 1 300-2, . . . 1 300 n).

5. The distillation unit (100 000) as claimed in claim 1; in which the n evaporation devices (10 000-1, 10 000-2, . . . 10 000-n) are n evaporators.

6. The distillation unit (100 000) as claimed in claim 5, in which case (IIIa) applies and each of the n evaporators is assigned a feed device (1 100-1, 1 100-2, . . . 1 100-n) for introducing the liquid substance mixture (10) to be evaporated.

7. The distillation unit (100 000) as claimed in claim 5, in which case (IIIa) applies and not every one of the n evaporators is assigned a feed device (1 100-1, 1 100-2, . . . 1 100-n) for introducing the liquid substance mixture (10) to be evaporated, wherein from each of the n evaporators that has a feed device (1 100-1, 1 100-2, . . . 1 100-n) leads a piping connection from the respective circulation device (1 200-1, 1 200-2, . . . 1 200-n) into the distillation column (20 000).

8. The distillation unit (100 000) as claimed in claim 1, in which a first portion of the n evaporation devices (10 000-1, 10 000-2, 2. . . 10 000-n) is disposed in one or more evaporators each having two or more separate chambers for receiving liquid bottom streams (21, 22, . . .), and in which a second portion of the n evaporation devices (10 000-1, 10 000-2, . . . 10 000-n) consists of evaporators.

9. The distillation unit (100 000) as claimed in claim 2, in which the chambers of an evaporator are of different sizes.

10. The distillation unit (100 000) as claimed claim 1, in which at least one of the n circulation devices (1 200-1, 1 200-2, . . . 1 200-n) has a controllable feed piping connection (1 500-1, 1 500-2, . . .) into one or more of the other n circulation devices (1 200-1, 1 200-2, . . . 1 200-n) that is configured to control the feed flow from the at least one of n circulation devices (1 200-1, 1 200-2, . . . 1 200-n) into the respective evaporation devices (10 000-1, 10 000-2, . . . 10 000-n).

11. The distillation unit (100 000) as claimed in claim 1, in which the evaporation unit (10 000) comprises a thin-film evaporator and/or a falling-film evaporator.

12. A continuously operated process for separating a liquid substance mixture (10) into n liquid product streams (201, 202, . . . 20*n*) of differing composition and a gaseous product stream (300), wherein n is a natural number in the range from 2 to 6, wherein the separation is conducted in a distillation unit (100 000) as claimed in claim 1.

13. The process as claimed in claim 12, in which case (IIIa) applies and the liquid bottom stream from the distillation column (20 000) is not recycled into all of the n circulation devices (1 200-1, 1 200-2, . . . 1 200-*n*), wherein at least that one of the n circulation devices (1 200-1, 1 200-2, . . . 1 200-*n*) through which the liquid product stream having the lowest viscosity of all liquid product streams (201, 202, . . . 20*n*) is provided is supplied with the liquid bottom stream from the distillation column (20 000), and wherein any of the n devices (2 200-1, 2 200-2, . . . 2 200-*n*) for recycling a liquid bottom stream from the distillation column (20 000) into at least one of the n circulation devices (1 200-1, 1 200-2, . . . 1 200-*n*) present that are not being used for recycling liquid bottom stream from the distillation column (20 000) are shut off.

14. The process as claimed in claim 12, in which,
the liquid substance mixture (10) comprises a mixture of di-and polyamines of the diphenylmethane series, which are separated into n liquid product streams (201, 202, . . . 20*n*) comprising mixtures of di-and polyamines of the diphenylmethane series each with a different content of diamines of the diphenylmethane series and a gaseous product stream (300) comprising diamines of the diphenylmethane series, or in which
the liquid substance mixture (10) comprises a mixture of di-and polyisocyanates of the diphenylmethane series, which are separated into n liquid product streams (201, 202, . . . 20*n*) comprising mixtures of di-and polyisocyanates of the diphenylmethane series each with a different content of diisocyanates of the diphenylmethane series and: a gaseous product stream (300) comprising diisocyanates of the diphenylmethane series.

15. The process as claimed in claim 12, in which n=2 or 3.

16. The distillation unit (100 000) as claimed in claim 4, in which n is equal to 2.

17. The distillation unit (100 000) as claimed in claim 8, in which the chambers of an evaporator are of different sizes.

18. The distillation unit (100 000) as claimed in claim 1, wherein the devices (2 200-1, 2200-2, . . . 2 200-*n*) for recycling a liquid bottom stream from the distillation column (20 000) into at least one of the n circulation devices (1 200-1, 1 200-2, . . . 1 200-*n*) are fluidically connected to each of the n circulation devices (1 200-1, 1 200-2, . . . 1 200-*n*) at a point upstream of the connection of each discharge device (1 300-1, 1 300-2, . . . 1 300-*n*) to each of the n circulation devices (1 200-1, 1 200-2, . . . 1 200-*n*).

19. A continuously operated process for separating a liquid substance mixture (10) into n liquid product streams (201, 202, . . . 20*n*) of differing composition and a gaseous product stream (300) in a distillation unit (100 000),
the distillation unit (100 000) comprising:
(i) a distillation column (20 000) which is not a dividing wall column and (ii) an evaporation unit (10 000) comprising n evaporation devices (10 000-1, 10 000-2, . . . 10 000-*n*), wherein n is a natural number in the range from 2 to 6;
the process comprising:
feeding the liquid substance mixture (10)
(a) into the evaporation unit (10 000), at least one of the n evaporation devices being assigned a feed device for the liquid substance mixture (10), or
(b) into the distillation column (20 000);
partially evaporating the liquid substance mixture (10) in the evaporation unit (10 000) and withdrawing n liquid bottom streams (21, 22, . . . 2*n*) and 1 to n gas streams (31, 32, . . . 3*n*) from the evaporation unit (10 000), wherein the n liquid bottom streams (21, 22, . . . 2*n*) are withdrawn from the n evaporation devices (10 000-1, 10 000-2, . . . 10 000-*n*) and are partially recycled via n circulation devices (1 200-1, 1 200-2, . . . 1 200-*n*) into the evaporation devices the n liquid bottom streams (21, 22, . . . 2*n*) were withdrawn from, and wherein the 1 to n gas streams (31, 32, . . . 3*n*) are fed to the distillation column (20 000);
combining a liquid bottom stream from the distillation column (20 000) with at least one of the n liquid bottom streams (21, 22, . . . 2*n*), in the case (b) with all of the n liquid bottom streams (21, 22, . . . 2*n*);
discharging the n liquid product streams (201, 202, . . . 20n) from the n circulation devices, wherein each of the n liquid product streams (201, 202, . . . 20*n*) comprises a portion of the n liquid bottom streams (21, 22, . . . 2*n*); and
discharging the gaseous product stream (300), optionally in condensed form (310), from the distillation column (20 000).

20. The process of claim 19, wherein the combining of the liquid bottom stream from the distillation column (20 000) with the at least one of the n liquid bottom streams (21, 22, . . . 2*n*), in the case (b) with all of the n liquid bottom streams (21, 22, . . . 2*n*), is performed at a point in the respective circulation device which lies upstream of the discharging of the respective liquid product stream (201, 202, . . . 20*n*).

21. The continuously operated process of claim 19, wherein the combining of a liquid bottom stream from the distillation column (20 000) with at least one of the n liquid bottom streams (21, 22, . . . 2*n*) takes place at a point in the n circulation devices (1 200-1, 1 200-2, . . . 1 200-*n*) that is upstream of the discharging of the n liquid product streams (201, 202, . . . 20*n*) from the n circulation devices (1 200-1, 1 200-2, . . . 1 200-*n*).

* * * * *